United States Patent
Suzuyama et al.

(10) Patent No.: US 9,815,121 B2
(45) Date of Patent: Nov. 14, 2017

(54) MACHINING HEAD (71) Applicant: FUJI MACHINE MFG. CO., LTD., Chiryu (JP)

(72) Inventors: Shigefumi Suzuyama, Toyota (JP); Osamu Nagai, Nagoya (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 0 days.

(21) Appl. No.: 15/028,845

(22) PCT Filed: Oct. 21, 2013

(86) PCT No.: PCT/JP2013/078500
§ 371 (c)(1),
(2) Date: Apr. 12, 2016

(87) PCT Pub. No.: WO2015/059756
PCT Pub. Date: Apr. 30, 2015

(65) Prior Publication Data
US 2016/0250692 A1 Sep. 1, 2016

(51) Int. Cl.
*B23B 29/32* (2006.01)
*B23Q 5/10* (2006.01)
(Continued)

(52) U.S. Cl.
CPC ............ *B23B 29/323* (2013.01); *B23B 3/065* (2013.01); *B23Q 5/10* (2013.01); *B23Q 16/102* (2013.01);
(Continued)

(58) Field of Classification Search
CPC ............... Y10T 408/37; Y10T 82/2587; Y10T 29/5154; Y10T 29/5153; B23B 29/323; B23B 29/24; B23Q 2220/002
(Continued)

(56) References Cited

U.S. PATENT DOCUMENTS

| 5,161,290 | A | * | 11/1992 | Hashimoto | ......... B23Q 16/025 |
| | | | | | 29/40 |
| 5,745,967 | A | * | 5/1998 | Kojima | ................ B23Q 5/048 |
| | | | | | 29/40 |
| 5,842,392 | A | | 12/1998 | Pfeifer et al. | |
| 6,704,983 | B2 | * | 3/2004 | Matsumoto | ............ B23Q 5/045 |
| | | | | | 29/40 |

(Continued)

FOREIGN PATENT DOCUMENTS

| GB | 2126134 A | * | 3/1984 | ........... B23B 29/323 |
| JP | 03277404 A | * | 12/1991 | ............. B23Q 39/02 |

(Continued)

OTHER PUBLICATIONS

International Search Report dated Jan. 14, 2014 in PCT/JP2013/078500 filed Oct. 21, 2013.

*Primary Examiner* — Erica E Cadugan
*Assistant Examiner* — Michael Vitale
(74) *Attorney, Agent, or Firm* — Oblon, McClelland, Maier & Neustadt, L.L.P.

(57) ABSTRACT

A machining head is provided with a turret on which multiple rotating tools are mounted, and this head is configured such that rotation of each of the multiple rotating tools during machining and rotation of the turret are performed by a single motor. A switchable turret rotation transmission mechanism is disposed to be capable of transmitting the rotation of the motor shaft to the turret as the rotation of the turret and releasing the transmission. The rotation of each of the multiple rotating tools during the machining and the rotation of the turret can be performed by the single motor.

6 Claims, 10 Drawing Sheets

(51) Int. Cl.
*B23Q 16/10* (2006.01)
*B23B 3/06* (2006.01)
*B23Q 39/04* (2006.01)
*B23Q 39/00* (2006.01)
*B23B 29/24* (2006.01)

(52) U.S. Cl.
CPC .............. *B23B 29/24* (2013.01); *B23Q 39/04* (2013.01); *B23Q 2039/004* (2013.01); *B23Q 2039/008* (2013.01); *B23Q 2220/002* (2013.01); *Y10T 29/5155* (2015.01); *Y10T 74/14* (2015.01); *Y10T 82/2587* (2015.01); *Y10T 408/37* (2015.01)

(58) Field of Classification Search
USPC .............................. 408/35; 82/159; 29/39, 40
See application file for complete search history.

(56) References Cited

U.S. PATENT DOCUMENTS 6,785,943 B2 * 9/2004 Sheehan .............. B23Q 16/102
 29/40
7,475,463 B1 * 1/2009 Chang .................... B23Q 5/04
 29/40

FOREIGN PATENT DOCUMENTS

| JP | 05096403 A | * | 4/1993 |
| JP | 7-100703 A | | 4/1995 |
| JP | 9-150303 A | | 6/1997 |
| JP | 3253974 B2 | | 2/2002 |
| JP | 2007-203449 A | | 8/2007 |
| JP | 2010-167538 A | | 8/2010 |

* cited by examiner

MACHINING HEAD

TECHNICAL FIELD

The present disclosure relates to a machining head that holds a rotating tool in order to perform machining.

BACKGROUND ART

In the related art, PTL 1 discloses, as a technique relating to a lathe, a technique in which, in addition to a bite as a type of tool, a lathe has a rotating tool such as a drill as another type of tool mounted on a turret, and performs machining by rotating the rotating tool. According to this technique, rotation of the rotating tool during the machining by the rotating tool and rotation of the turret are performed by a single motor.

CITATION LIST

Patent Literature

PTL 1: Japanese Patent No. 3253974

SUMMARY

Problem to be Solved

The technique disclosed in PTL 1 is a technique for performing machining with a single rotating tool mounted on a turret; however, for improving machining variation, it is desirable that multiple rotating tools are mounted on the turret, such that one of the rotating tools to be used is able to be selected by the turret being rotated, so that machining is able to be performed by any one of the multiple rotating tools. The inventor of the present application has reached a conclusion that the practicality of a machining head which is provided with a turret holding multiple rotating tools can be improved by responding to these needs. The present disclosure is based on this knowledge, and an object thereof is to provide a machining head that has a high level of practicality.

Means for Solving the Problem

A machining head according to the present disclosure, which is to address the above-described problem, is a machining head that is provided with a turret on which multiple rotating tools are mounted; a single motor is configured to perform both rotation of each of the multiple rotating tools during machining and rotation of the turret.

Effects

The machining head according to the present disclosure can perform both the rotation of each of the multiple rotating tools during machining and the rotation of the turret with a single motor, and thus is highly practical.

DESCRIPTION OF EMBODIMENTS

Hereinafter, a representative embodiment of the present disclosure will he described in detail with reference to the accompanying drawings. The present disclosure is not limited to the following embodiment and can be realized in various modified or improved forms based on the knowledge of those skilled in the art.

EXAMPLE

Hereinafter, an embodiment of a machining head according to the present disclosure will be described in the order of the overall configuration of a work system that is equipped with the machining head, the configuration of the machining head, and operation and so on of the machining head.

[A] Overall Configuration of Work System

Figure 1:
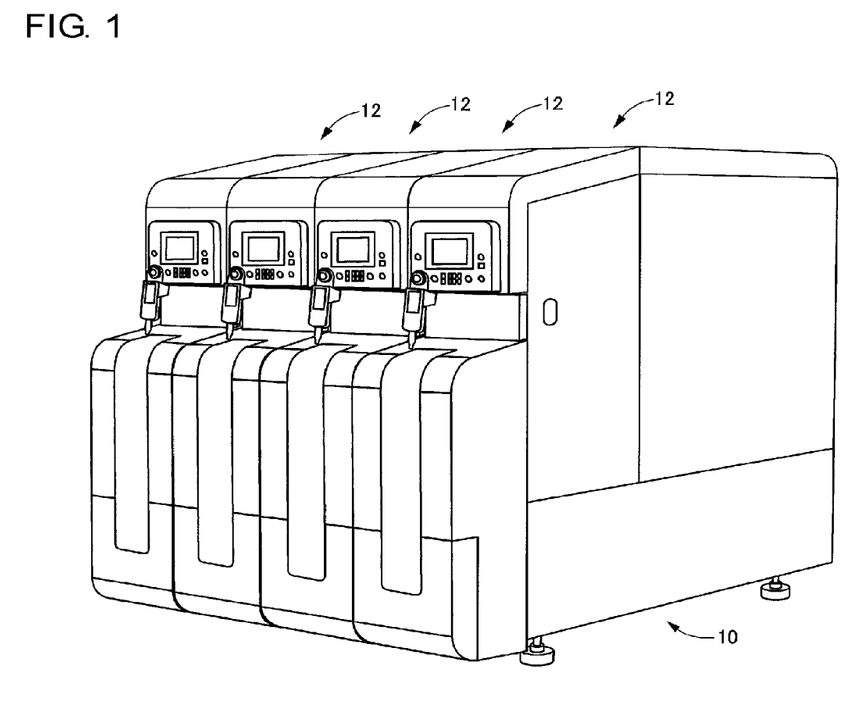
FIG. 1 is an external view illustrating a work system in which an embodiment of he machining head is used.
Figure 2:
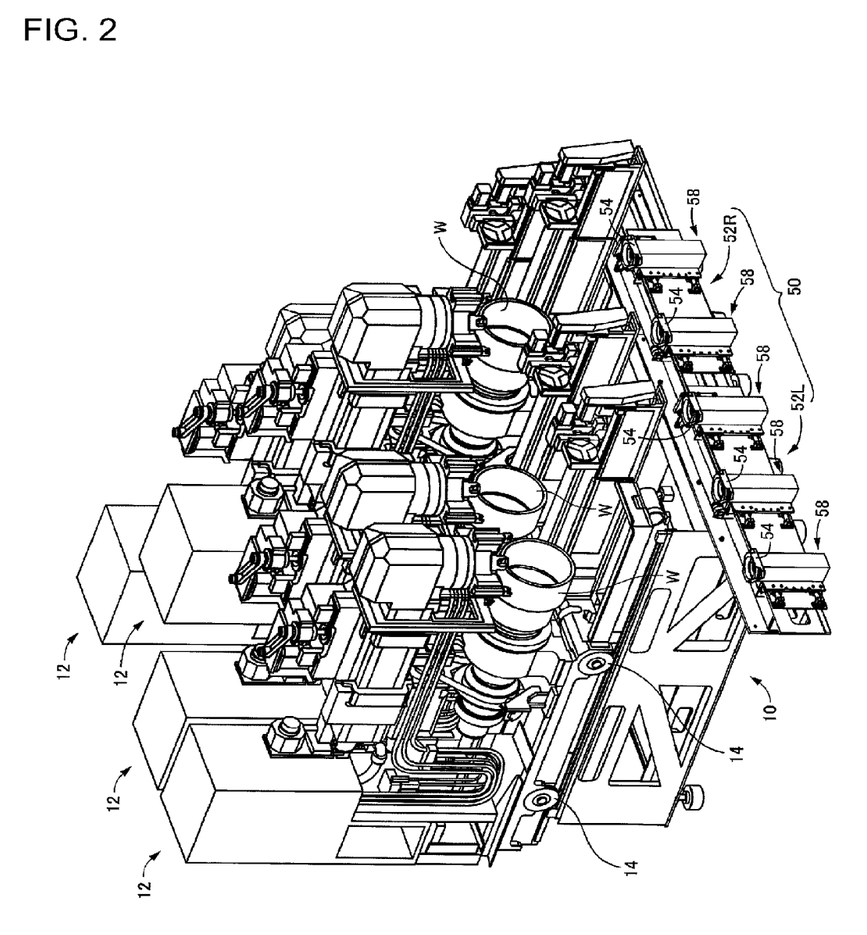
FIG. 2 is a perspective view illustrating the work system with exterior panels removed.

The work system illustrated in FIG. 1 is configured to include one system base 10 and four working machines 12 that are placed side by side on system base 10. FIG. 1 shows the work system with exterior panels attached. FIG. 2 shows, from a viewpoint different to that of FIG. 1, the work system with the exterior panels removed.

In this work system, each of the working machines 12 is able to be drawn out of system 10 in a longitudinal direction by wheels 14 rolling on a rail that is laid on system base 10. FIG. 2 shows a state where the third working machine 12 from the left (second working machine 12 from the right) is drawn out by a certain distance. Although not illustrated in detail in the drawing, two base units, on each of which are loaded two working machines 12, are lined up next to each other and fixed to each other to constitute system base 10.

Figure 3:
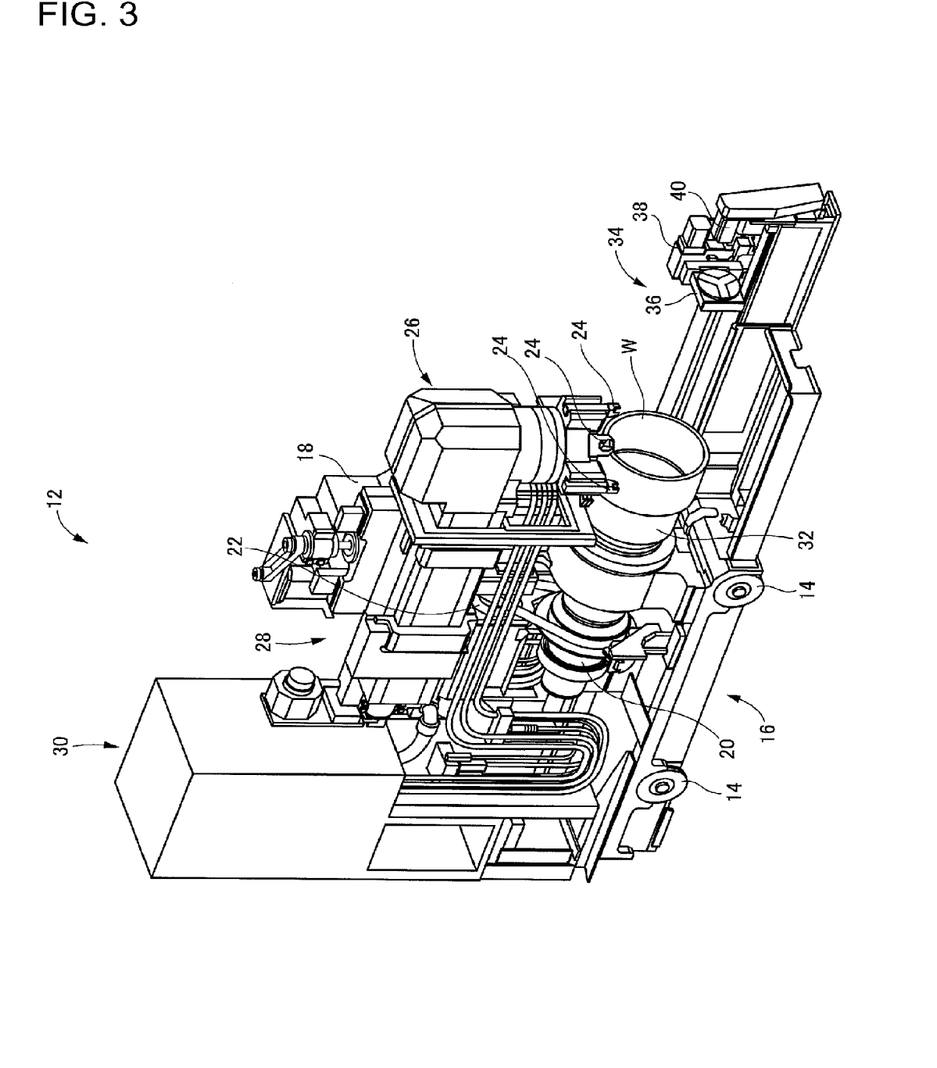
FIG. 3 is a perspective view illustrating a working machine.

Each of the four working machines 12 is a machine tool, a lathe to be specific, with substantially the same configuration. Broadly speaking, each of the working machines 12 is configured to include, as illustrated in FIG. 3, bed 16 where wheel 14 is disposed, pillar 18 that is erected on bed 16, spindle 20 that is rotatably held by pillar 18, motor 22 that rotates spindle 20, turret-type machining head 26 that holds multiple bites 24, head moving device 28 that is supported by pillar 18 and moves the machining head 26 forward, backward, upward, and downward, and control panel 30 that controls working machine 12. Work W, which is a work object, is held by chuck 32 that is mounted on the front end of spindle 20 as illustrated in the drawing; lathing is performed on the work W, by one of the multiple bites 24 that are held by machining head 26, by machining head 26 being moved while work W is rotated.

Work loader 34, which, extends forward from bed 16, attaches and detaches work W to and from chuck 32. Work loader 34 is configured to include work holder 36 where two chucks are disposed on the backs of each other, holder rotating device 38 that rotates work holder 36 about an axis which extends to the left and right, and holder moving device 40 that moves work holder 36 forward and backward. At a delivery position that is set on the front side, work holder 36 grips, from above, work W that is conveyed by a conveyance device (described later); then, work holder 36 rotates work W, transports work W backward, and causes work W to be held by chuck 32. In addition, work holder 36 receives work W from chuck 32 after machining is completed, and then transports the received work W to the delivery position, rotates work W, and passes work W on to the conveyance device. Work W that is illustrated in the drawing is the largest work W that can be machined by working machine 12, and although not illustrated in the drawing, a relatively large chuck pawl is mounted on work holder 36 when the attachment and detachment of work W to and from chuck 32 are performed.

Conveyance device 50, which conveys and passes work W on to the four working machines 12, is arranged on the front side surface of system base 10 as illustrated in FIG. 2 so as not to interfere with working machines 12 when working machines 12 are drawn forward. Two conveyance device units, 52L and 52R (hereinafter, referred to as left-side unit 52L and right-side unit 52R in some cases), which are lined up next to each other, constitute conveyance device 50. More specifically, left-side unit 52L, is attached to the left, one of the two above-described base units, and right-side unit 52R is attached to the right one of the two above-described base units. This work system performs machining on one work W in order from the working machine 12 on the left side, and thus conveyance device 50 has the function of conveying and passing the one work W on to the four working machines 12 in this order from the left to right. In other words, work W, which is a conveyance target object for conveyance device 50, is conveyed to the right.

In further detail, three work support units 58, each with table 54 where work W is placed, are disposed in left-side unit 52L, and two other work support units 58 are disposed in the right-side unit. These five work support units 58 simultaneously reciprocate to the left and right. Conveyance device 50 conveys work W based on the operation of the five work support units 58. Tables 54 are raised during the delivery of work W involving work loader 34 described above. When large work W as illustrated in FIG. 2 is conveyed, auxiliary tables are mounted on tables 54 so that the work W can be loaded.

[B] Configuration of Machining Head

The above-described working machine 12 is a lathe, however, the machining head according to the embodiment is used instead of machining head 26 in a case where working machine 12 functions as a drilling machine, a milling machine, a machine tool in which a drilling machine and a milling machine are combined with each other, or a machine tool in which at least one of a drilling machine and a milling machine are combined with a lathe.

Figure 4:
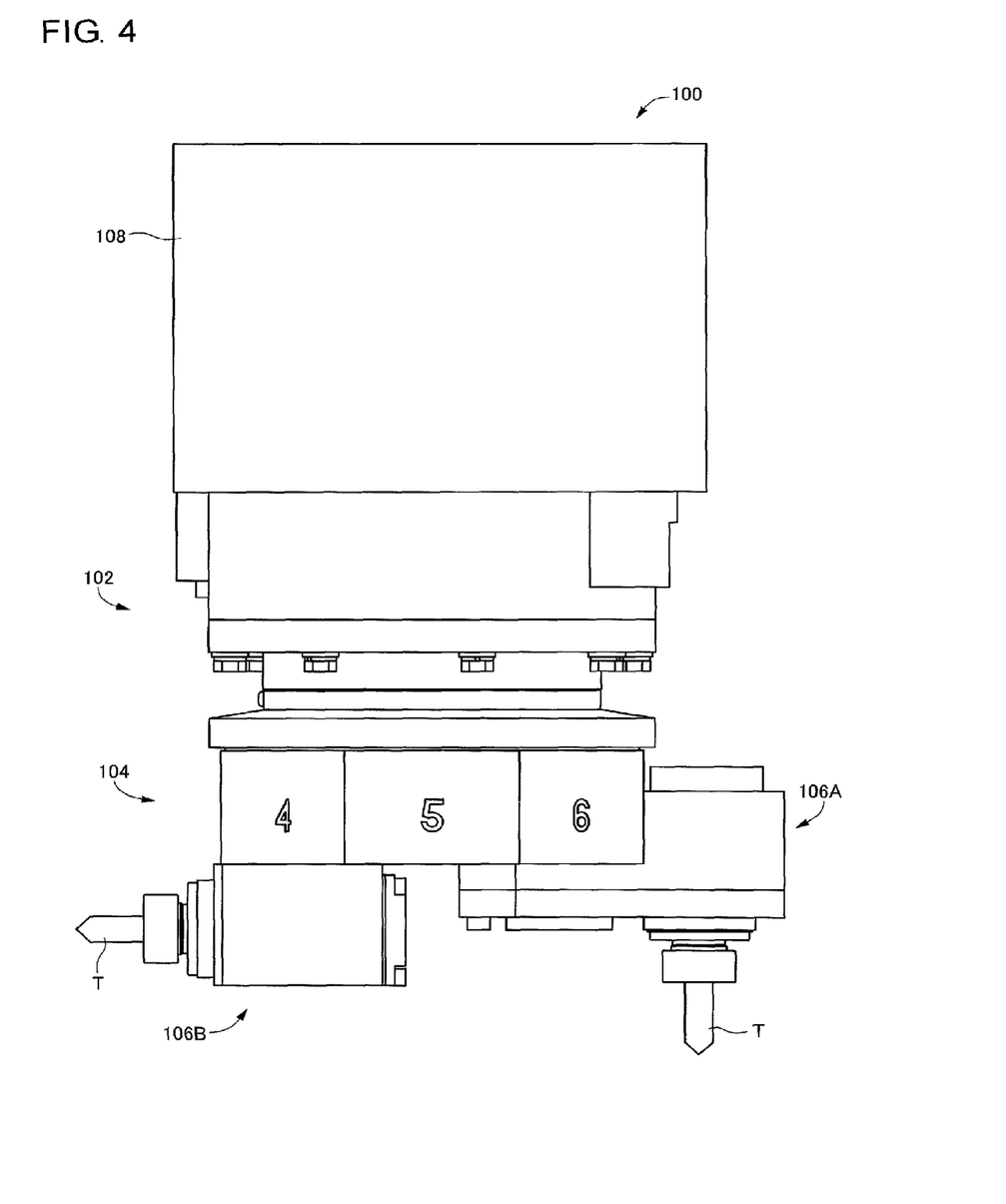
FIG. 4 is a front view illustrating an embodiment of the machining head.

FIG. 4 is a diagram in which machining head 100 according to the embodiment is viewed from the front, that is, a front view of machining head 100 according to the embodiment. Broadly speaking, machining head 100 is configured to include base body 102, turret 104 that is rotatably held by base body 102, and tool attaching unit 106 that is mounted on turret 104 as illustrated in this drawing. According to the drawing, two types of tool attaching units, 106A and 106B, are mounted. Tool attaching unit 106A is for rotating tool T to be mounted extending in a perpendicular direction, and tool attaching unit 106B is for rotating tool T to be mounted extending in a horizontal direction. Hereinafter, these will be collectively referred to as tool attaching unit 106 in some cases. Cover 108 covers an upper portion of base body 102.

Figure 5:
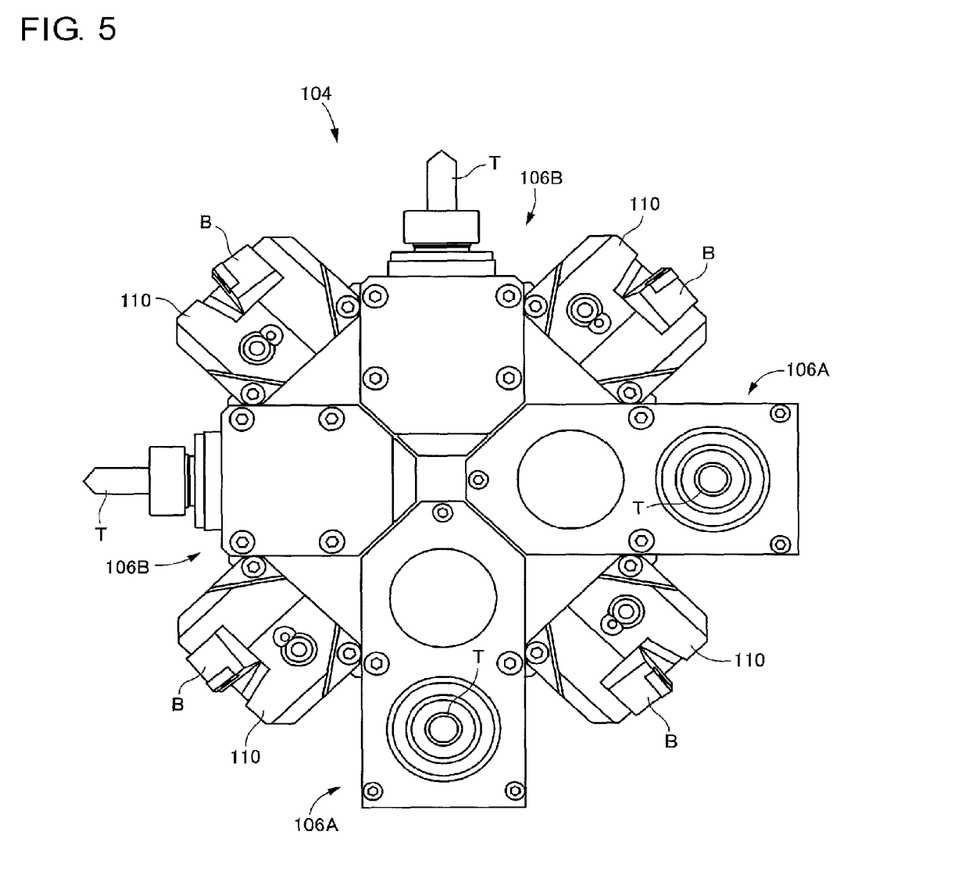
FIG. 5 is a diagram in which the embodiment of the machining head is viewed from below.

Eight mounting stages are disposed in turret 104 in its circumferential direction, and four tool attaching units 106 can be mounted on four of the eight mounting stages at an angular pitch of 90°. In other words, tool attaching unit 106 can be mounted on every other one of the eight mounting stages. In addition, a bite holder can also be mounted on each of the eight mounting stages, and a bite can be mounted on turret 104 via the bite holder. FIG. 5 is a diagram in which machining head 100 is viewed from below. This drawing shows a state where four bite holders 110, which hold four respective bites B, are mounted in addition to the two tool attaching units 106A and the two tool attaching units 106B.

Figure 6:
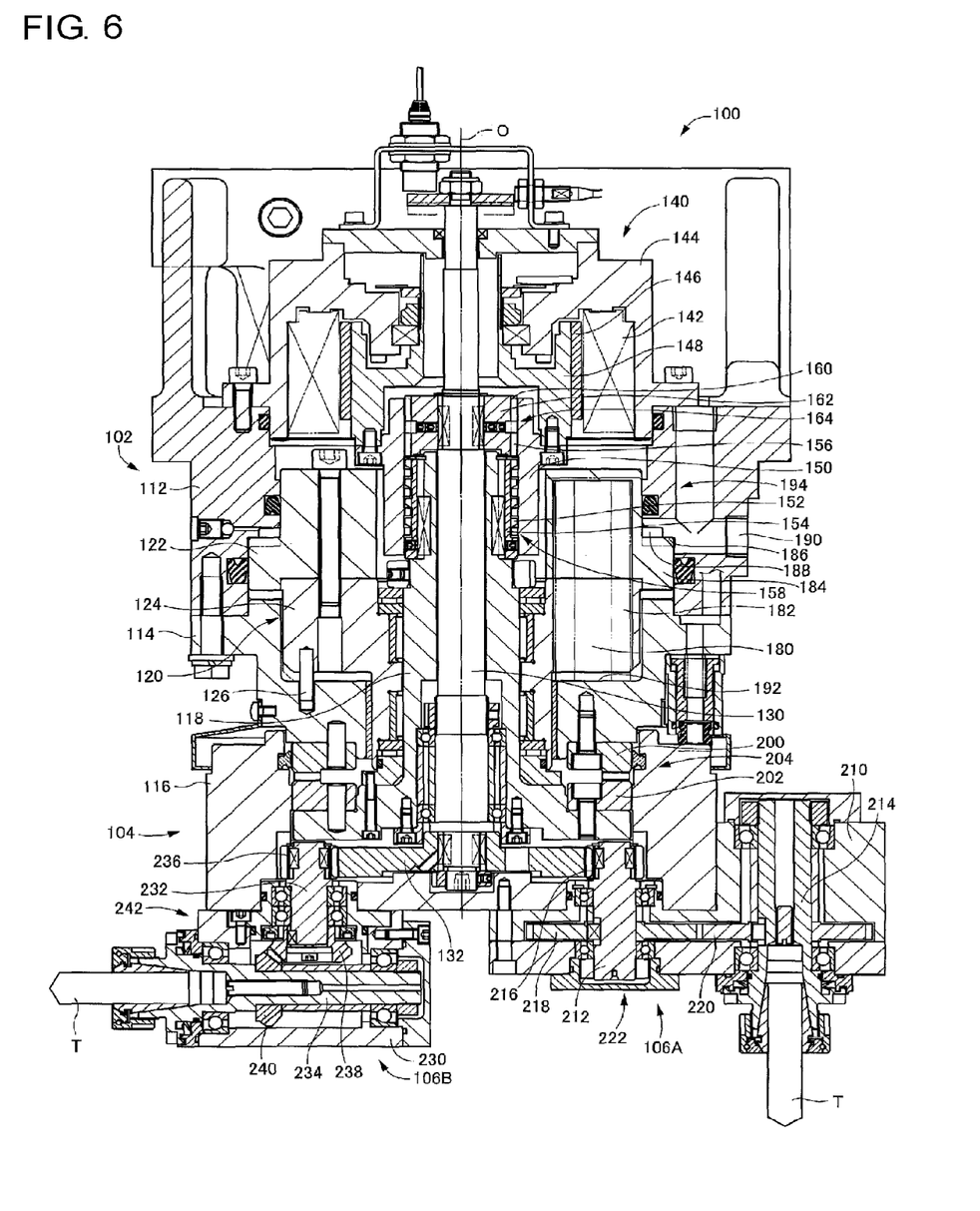
FIG. 6 is a vertical cross-sectional view illustrating the embodiment of the machining head from the front.
Figure 7:
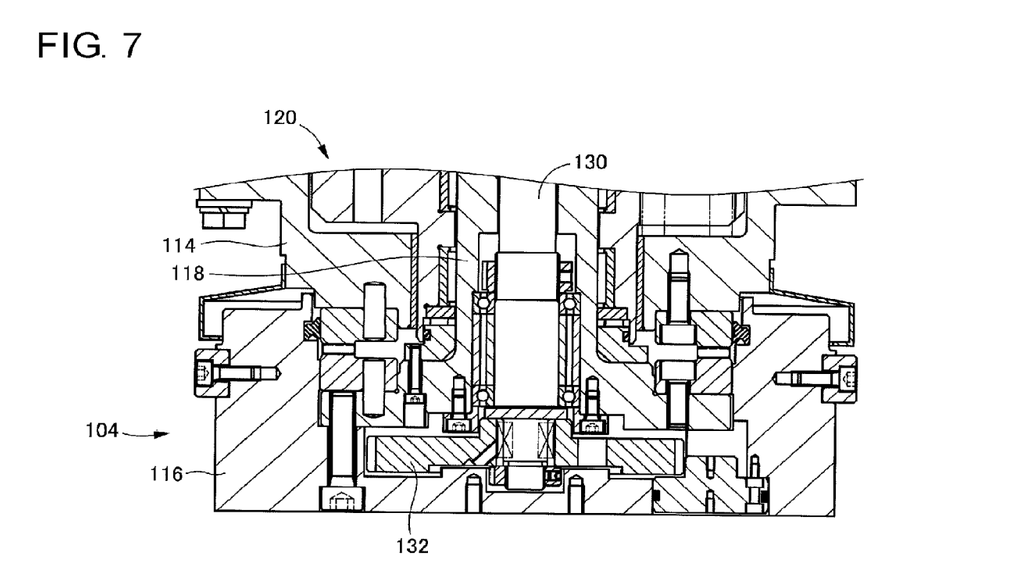
FIG. 7 is a vertical cross-sectional view 11 lustrating the embodiment of the machining head with a different cross section to that of FIG. 6.

FIG. 6 is a vertical cross-sectional view illustrating machining head 100 from a front viewpoint with cover 108 removed. FIG. 7 is a partial cross-sectional view in which machining head 100 is in a cross section different to that of FIG. 6. As is apparent from FIGS. 6 and 7, first base member 112 and second base member 114 constitute base body 102, and first base member 112 and second base member 114 are fastened to each other in a vertical direction with each having a substantially tubular shape. Turret 104 has turret main body 116 that has an octagonal outer periphery and a circular recess at the center, and tubular body 118 that is fastened to turret main body 116 at a flange that is formed in a lower end portion and extends upward from turret main body 116. This tubular body 118 functions as a tubular portion of turret 104.

Tubular body 118 of turret 104 is held by base body 102 via holding tube 120. Holding tube 120 is configured by upper tubular member 122 and lower tubular member 124 being fastened to each other. In base body 102, holding tube 120 is held by base body 102 in a state where rotation is prohibited by detent pin 126 while movement in the vertical direction is allowed. In a state where tubular body 118 of turret 104 is inserted into holding tube 120, holding tube 120 holds tubular body 118 immovably in the vertical direction, but allowing rotation. In this manner, turret 104 is held to be capable of moving in the vertical direction and rotating with respect to base body 102, Tubular body 118 of turret 104 holds main spindle 130 of machining head 100 rotatably but immovably in the vertical direction such that main spindle 130 passes through tubular body 118. Main spindle 130 extends downward from tubular body 118, and main gear 132, which is a spur gear, is fitted into a lower end portion to be incapable of rotating or moving in the vertical direction. This main gear 132 is placed in a cavity that is formed between a bottom wall of turret main body 116 and a flange of tubular body 118. In addition, main spindle 130 extends upward from tubular body 118 as well, and the extending part functions as an extending portion of main spindle 130.

Motor 140 is fixed to the upper portion of base body 102. Motor 140 has housing 144 that holds coil 142 and hollow motor shaft 148 that has an outer peripheral portion to which magnet 146 is attached. The part of main spindle 130 that extends upward from tubular body 118 further extends upward through hollow motor shaft 148 as well. Motor 140 is a so-called direct drive motor (DD motor)

In the above-described structure, the central axis of turret 104, central axis of tubular body 118 of turret 104, central axis of main spindle 130, and central axis of motor shaft 148 correspond to one another without exception, as is apparent from the drawing; these central axes are axis O that is illustrated in the drawing. In other words, turret 104, tubular body 118, main spindle 130, and motor shaft 148 are coaxially arranged, and each of turret 104, tubular body 118, main spindle 130, and motor shaft 148 rotates with axis O at its center, that is, about axis O. Hereinafter, the direction in which axis O extends will be referred to as the axial direction in some cases.

Figure 8:
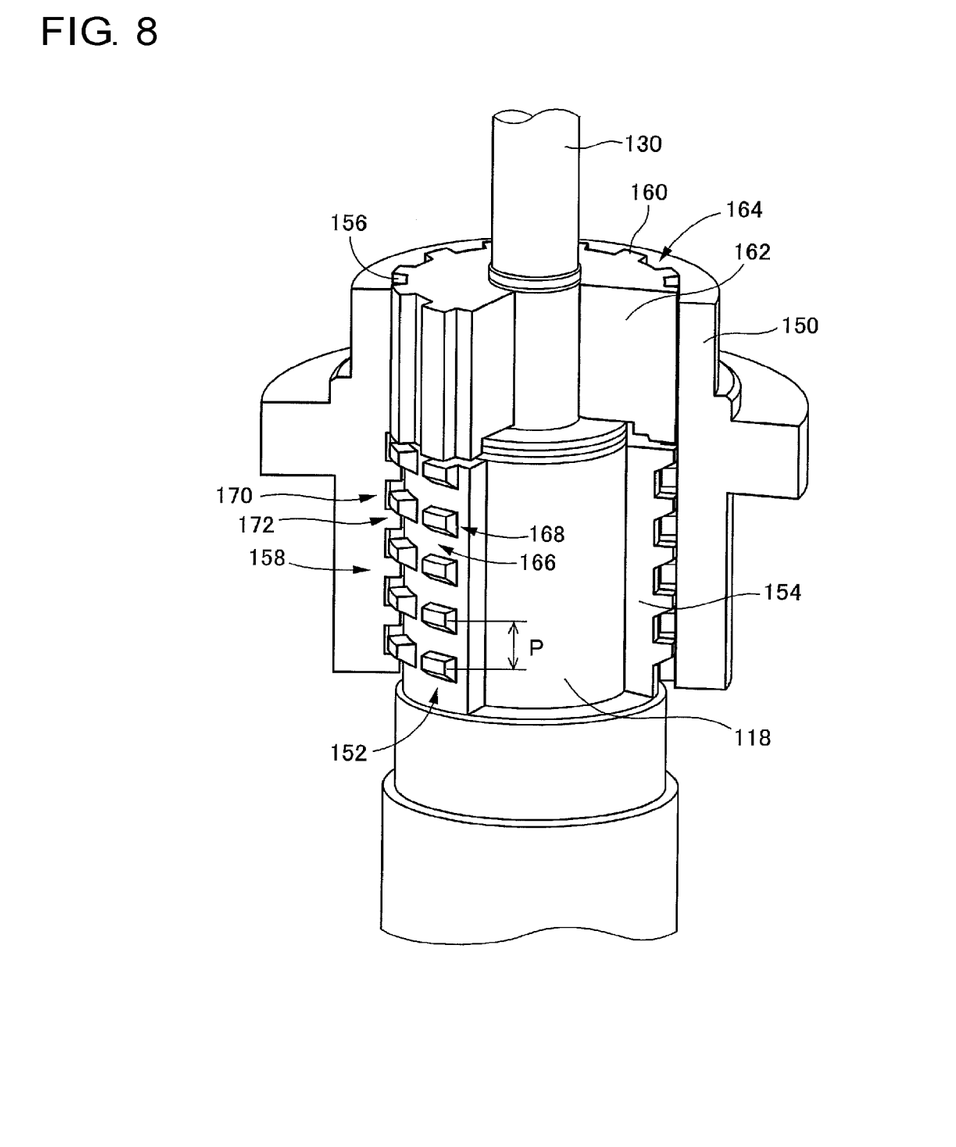
FIG. 8 is a perspective partial cross-sectional view of a part of the machining head of the embodiment that transmits motor rotation.

Rotary tube 150 is fastened to a lower end portion of motor shaft 148. This rotary tube 150 functions as a member for transmitting the rotation of motor shaft 148 to main spindle 130 and tubular body 118 of turret 104 by being rotated about axis O by the rotation of motor shaft 148. FIG. 8 is a perspective view of a part where the transmission of the rotation is performed. Referring to this drawing, splice tube 154 that has an outer peripheral portion where spline 152 is formed is externally fitted into tubular body 118 to be incapable of rotating with respect to tubular body 118 and incapable of moving in the axial direction, and spline tube 154 functions as an outer peripheral portion of tubular body 118. Simply put, spline 152 is formed in the outer peripheral portion of tubular body 118. Spline 156 is formed in an inner peripheral portion of rotary tube 150 as well, and rotary tube 150 that is externally fitted into tubular body 118 is in spline fitting with tubular body 118 via spline tube 154. In other words, spline 152 that is formed in the outer peripheral portion of tubular body 118 and spline 156 that is formed in the inner peripheral portion of rotary tube 150, a part on a lower side of spline 156 to be specific, constitute a spline mechanism 158 (hereinafter, referred to as "first spline mechanism 158" in some cases)

The part of main spindle 130 that extends upward from tubular body 118 being called the extending portion, spline ring 162 that has an outer peripheral portion where spline 160 is formed is externally fitted into the extending portion to be incapable of rotating or moving in the axial direction. Spline ring 162 functions as an outer peripheral portion of the extending portion of main spindle 130. Simply put, spline 160 is formed in the outer peripheral portion of the extending portion of main spindle 130. This spline 160 meshes with spline 156 that is formed in the inner peripheral portion of rotary tube 150. In other words, rotary tube 150 is in spline fitting with the main spindle 130. In other words, a part of the inner peripheral portion of rotary tube 150 that faces the above-described extending portion being called a facing portion, spline 160 that is formed in spline ring 162 in the extending portion and an upper part of spline 156 formed in the facing portion of rotary tube 150 constitute another spline mechanism 164 (hereinafter, referred to as "second spline mechanism 164" in some cases).

Structural characteristics of this machining head 100 will be described; the above-described first spline mechanism 158 is not a simple spline mechanism. Spline 152 that is formed in spline tube 154 is shaped such that multiple toothless portions 166 with no tooth over the entire periphery and multiple toothed portions 168 with teeth over the entire periphery are alternately aligned at an equal pitch P in the axial direction; likewise, the part on the lower side of spline 156 that is formed in the inner peripheral portion of rotary tube 150 is shaped such that multiple toothless portions 170 with no tooth over the entire periphery and multiple toothed portions 172 with teeth over the entire periphery are alternately aligned at the equal pitch P in the axial direction. The multiple toothed portions 168 that are formed in spline 152 have the same length in the axial direction, and the multiple toothless portions 166 have the same length in the axial direction. The axial length of each of the multiple toothed portions 168 is slightly smaller than the axial length of each of the multiple toothless portions 166. Likewise, the multiple toothed portions 172 that are formed at the part on the lower side of spline 156 have the same length in the axial direction, the multiple toothless portions 170 have the same length in the axial direction, and the axial length of each of the multiple toothed portions 172 is slightly smaller than the axial length of each of the multiple toothless portions 170.

In the state illustrated in FIGS. 6 and 8, the multiple toothed portions 168 of spline 152 and the multiple toothless portions 170 of spline 156 are positioned at positions matching with each other in the axial direction and the multiple toothless portions 166 of the spline 152 and the multiple toothed portions 172 of the spline 156 are positioned at positions matching with each other in the axial direction. In a case where turret 104 moves downward by a distance equivalent to half of the above-described pitch P with respect to rotary tube 150 from this state, the multiple toothed portions 168 of spline 152 and the multiple toothed portions 172 of spline 156 are put into a state of being positioned at positions matching with each other in the axial direction. The axial position of turret 104 with respect to rotary tube 150 in this state being called a first position and the axial position of turret 104 with respect to rotary tube 150 in the previous state, that is, the state illustrated in the drawing being called a second position, spline 152 and spline 156 mesh with each other in a state where turret 104 is positioned at the first position, whereas spline 152 and spline 156 do not mesh with each other in a state where turret 104 is positioned at the second position. First spline mechanism 158 is a spline mechanism that has the above-described structure. The states where turret 104 is positioned at the first position and the second position with respect to base body 102 have the same meaning as the states where tubular body 118 of turret 104 is positioned at the first position and the second position with respect to rotary tube 150, respectively.

Accordingly, in a case where turret 104 is positioned at the first position, the rotation of rotary tube 150, that is, the rotation of motor shaft 148 is transmitted to tubular body 118 via the first spline mechanism and turret 104 is rotated by the motor 140 in a case where turret 104 is positioned at the second position, the rotation of motor shaft 148 is not transmitted to tubular body 118 and turret 104 does not rotate even if motor shaft 148 rotates.

As described above, main spindle 130 is held by tubular body 118 to be incapable of moving in the axial direction, and thus main spindle 130 is moved along with turret 104 in a case where turret 104 is moved in the axial direction. Unlike the transmission of the rotation from rotary tube 150 to tubular body 118, the rotation of rotary tube 150, that is, the rotation of motor shaft 148, is transmitted to main spindle 130 via second spline mechanism 164 and main spindle 130 is rotated by motor 140 in a case where turret 104 is positioned at either the first position or the second position. However, in a state where turret 104 is positioned at the first position, turret 104 is also rotated by the rotation of motor shaft 148 as described above, and thus main spindle 130 is in a state of non-rotation with respect to turret 104.

As described above, tubular body 118 is held by holding tube 120 to be incapable of moving in the axial direction. Multiple spring holding holes 180, which are placed on the same circumference with each being open downward, are disposed in holding tube 120, and compression coil spring 182 is arranged in each of the multiple spring holding holes 180. Holding tube 120 is biased upward by an elastic reaction force of spring 182. Holding tube that has flange 184 in an axial intermediate portion. By an upper surface of a peripheral end of the flange 184 being locked by locking surface 186 that is disposed in base body 102 as illustrated in FIG. 6, holding tube 120 is positioned at an upper end position within a range of axial movement thereof. Turret 104 is positioned at the second position described above by holding tube 120 being positioned at the upper end position.

Annular hydraulic chamber 188, which is partitioned by the upper surface of flange 184 and a part of base body 102, is disposed in machining head 100. High-pressure hydraulic oil is supplied to this hydraulic chamber 188 via hydraulic oil port 190. The hydraulic oil supply causes a force that depends on the pressure of the hydraulic oil in hydraulic chamber 188 to overcome the biasing force of compression coil spring 182, thus causing holding tube 120 to move downward. This movement is stopped by a lower portion of holding tube 120 being locked by another locking surface 192 that is disposed in base body 102. In this state, holding tube 120 is positioned at a lower end position within the axial range of movement thereof, and turret 104 is positioned at the first position described above. When the supply of high-pressure hydraulic oil is stopped, holding tube 120 is moved upward and turret 104 is returned to the second position by the elastic reaction force of compression coil spring 182.

In the above-described structure, machining head 100 is provided with relative moving device 194 that moves the turret 104, which is configured to include hydraulic chamber 188, port 190, locking surface 186, locking surface 192, and the like, between the first position and the second position described above. In addition, mentioning the transmission of the rotation to turret 104 of machining head 100 with reference to the above-described configuration, this machining head 100 has a mechanism that is configured to include rotary tube 150, first spline mechanism 158, and relative moving device 194, that is, a switchable turret rotation transmission mechanism that is capable of transmitting the rotation of motor shaft 148 to turret 104 as the rotation thereof and releasing the transmission.

Furthermore, in machining head 100, coupling rings 200 and 202 that have multiple radially-formed teeth are fixed respectively to a lower surface of base body 102 and the upper surface of the flange of tubular body 118 of turret 104 such that the multiple teeth formed on coupling rings 200 and 202 face each other. The coupling ring 202 that is fixed to turret 104 moves in the axial direction, that is, the vertical direction along with turret 104. As illustrated in FIG. 6, coupling rings 200 and 202 mesh with each other in a case where turret 104 is positioned at the second position described above. The rotation of turret 104 with respect to base body 102 is prohibited by this meshing. In a case where turret 104 is positioned at the first position described above, coupling rings 200 and 202 are separated from each other in the vertical direction and do not mesh with each other, and the rotation of turret 104 with respect to base body 102 is allowed. As is apparent from the structure described above, machining head 100 is provided with a mechanism that is configured to include coupling rings 200 and 202, that is, switchable connection mechanism 204 that allows the rotation of turret 104 with respect to base body 102 in a state where turret 104 is positioned at the first position and prohibits the rotation of turret 104 with respect to base body 102 in a state where turret 104 is positioned at the second position.

Tool attaching unit 106A is configured to include casing 210, intermediate shaft 212 that is rotatably held by casing 210 extending in the axial direction, and tool holding shaft 214 that is rotatably held by casing 210 extending in the axial direction and holds the rotating tool T. A collet is disposed at a tip of tool holding shaft 214, and rotating tool T is fixedly held by tool holding shaft 214 by this collet. Pinion 216, which is a spur gear with a small diameter, is externally fitted in a fixed manner into an upper end portion of the intermediate shaft 212. In a state where tool attaching unit 106A is mounted on turret 104, pinion 216 meshes with main gear 132 described above. In addition, an intermediate gear 218, which is a spur gear, is externally fitted in a non-rotatable manner into an axial intermediate portion of intermediate shaft 212, and an end gear 220, which is a spur gear, is externally fitted in a non-rotatable manner into an axial intermediate portion of tool holding shaft 214. Intermediate gear 218 and end gear 220 mesh with each other. Accordingly, when main gear 132 is rotated by the rotation of main spindle 130, the rotation of main gear 132 is transmitted to tool holding shaft 214 via pinion 216, intermediate shaft 212, intermediate gear 218, and end gear 220, such that rotating tool T is rotated. This machining head 100 has the above-described rotation transmission mechanism, that is, first tool rotation transmission mechanism 222 that transmits the rotation of main spindle 130 to tool holding shaft 214 as the rotation of tool holding shaft 214.

Likewise, tool attaching unit 106B is configured to include casing 230, intermediate shaft 232 that is rotatably held by casing 230 extending in the axial direction, and tool holding shaft 234 that is rotatably held by casing 230 extending in the horizontal direction and holds rotating tool T. Likewise, a collet is disposed at a tip of tool holding shaft 234, and rotating tool T is fixedly held by tool holding shaft 234 by this collet. Pinion 236, which is a spur gear with a small diameter, is externally fitted in a fixed manner into an upper end portion of intermediate shaft 232 as in tool attaching unit 106A. In a state where tool attaching unit 106B is mounted on turret 104, pinion 236 also meshes with the main gear 132. In tool attaching unit 106B, intermediate gear 238, which is a bevel gear, is externally fitted in a non-rotatable manner into a lower end portion of intermediate shaft 232, and end gear 240, which is a bevel gear, is externally fitted in a non-rotatable manner into an axial intermediate portion of tool holding shaft 234. Intermediate gear 238 and end gear 240 mesh with each other. Accordingly, when main gear 132 is rotated by the rotation of main spindle 130, the rotation of main gear 132 is transmitted to tool holding shaft 234 via pinion 236, intermediate shaft 232, intermediate gear 238, and end gear 240, such that rotating tool T is rotated as in the tool attaching unit 106A. This machining head 100 has the above-described rotation transmission mechanism, that is, a second tool rotation transmission mechanism 242 that transmits the rotation of main spindle 130 to tool holding shaft 234 as the rotation of tool holding shaft 234.

In view of the functions of first tool rotation transmission mechanism 222 and second tool rotation transmission mechanism 242 described above, it is conceivable that this machining head 100 is configured to have a single tool rotation transmission mechanism that transmits the rotation of main spindle 130 to each of the multiple tool holding shafts 214 and 234 as the rotation of each by using first tool rotation transmission mechanism 222 and second tool rotation transmission mechanism 242. In a case where a tool attaching unit other than tool attaching units 106A and 106B is mounted, a tool rotation transmission mechanism that is similar to first tool rotation transmission mechanism 222 and the tool rotation transmission mechanism 242 of the tool attaching units 106A and 106B may be disposed in the tool attaching unit.

[C] Operation and so on of the Machining Head

In a case where cutting is performed by one of the multiple rotating tools T, turret 104 is in a state of being positioned at the second position as illustrated in FIG. 6. In this state, as described above, the transmission of the rotation from motor shaft 148 to turret 104 by first spline mechanism 158 is not performed with the rotation of turret 104 with respect to base body 102 being prohibited by switchable connection mechanism 204. Accordingly, turret 104 does not rotate even if motor shaft 148 rotates. An operation of motor 140 in this state causes the rotation of motor shaft 148 to be transmitted to tool holding shafts 214 and 234 by main spindle 130, second spline mechanism 164, first tool rotation transmission mechanism 222, and second tool rotation transmission mechanism 242, thus causing rotating tool T to rotate. Drilling and milling can be performed on work W by any one of the multiple rotating tools T as machining head 100 is moved in a state where the rotating tool T has been rotated.

When one rotating tool T that is scheduled to perform machining is positioned at a specific position, turret 104 is lowered by the distance equivalent to half of the pitch P by the above-described relative moving device 194 as partly illustrated with a two-dot chain line in FIG. 6. When motor 140 is operated in this state, the rotation of motor shaft 148 is transmitted to tubular body 118 of turret 104 by first spline mechanism 158 such that turret 104 is rotated. In this case, as described above, a state is achieved where the rotation of motor shaft 148 is transmitted to main spindle 130 by second spline mechanism 164, but none of the rotating tools T rotates since turret 104 and main spindle 130 rotate integrally with each other.

In machining head 100, as described above, the transmission of the rotation from motor shaft 148 to turret 104 and the release of the transmission are selectively performed by the switchable turret rotation transmission mechanism that is configured to include rotary tube 150, first spline mechanism 158, and relative moving device 194. Relative moving device 194 moves turret 104 by only half of the pitch P in the axial direction for this selection. The first spline mechanism 158 is configured such that the multiple toothless portions 166 and 170 and the multiple toothed portions 168 and 172 are alternately aligned at equal pitches in the respective spline 152 and spline 156 constituting first spline mechanism 158, and thus can release the transmission of the rotation from motor shaft 148 to turret 104 by merely moving turret 104 by such a short distance while ensuring the transmission of sufficient rotation torque from motor shaft 148 to turret 104.

In machining head 100, motor shaft 148, main spindle 130, tubular body 118 of turret 104, and rotary tube 150 are coaxially arranged, and thus machining head 100 can be compact in size. In other words, the machining head has a compact configuration so that, for example, motor 140 is prevented from being disproportionately placed in a direction intersecting with the axial direction.

In this machining head 100, relative moving device 194 releases the transmission of the rotation from motor shaft 148 to tubular body 118 by moving turret 104, that is, tubular body 118 of turret 104 with respect to rotary tube 150. However, different configurations may be adopted in place of this configuration. For example, a relative moving device that moves rotary tube 150 with respect to tubular body 118 of turret 104 may be adopted and the transmission of the rotation from motor shaft 148 to tubular body 118 may be released by rotary tube 150 being moved.

Figure 9:
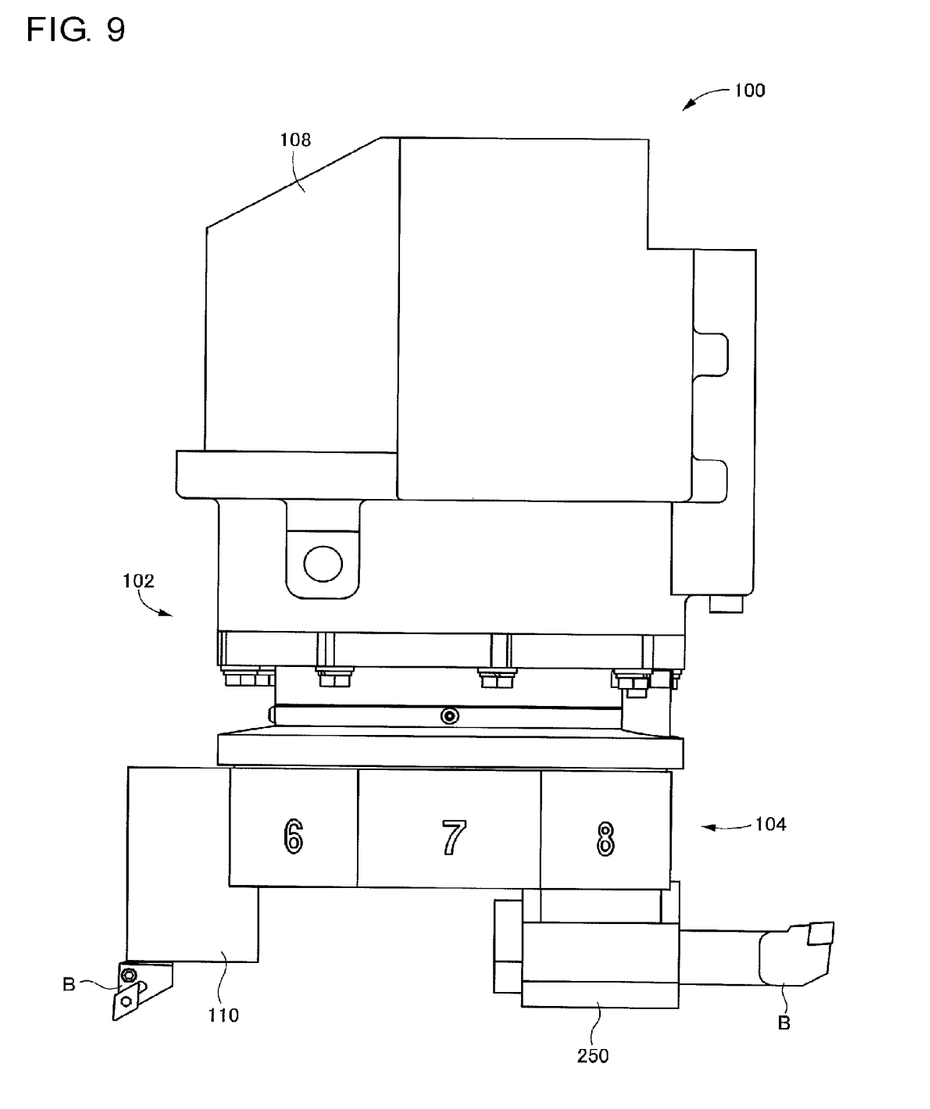
FIG. 9 is a side view illustrating an embodiment of the machining head that holds a bite instead of a rotating tool.
Figure 10:
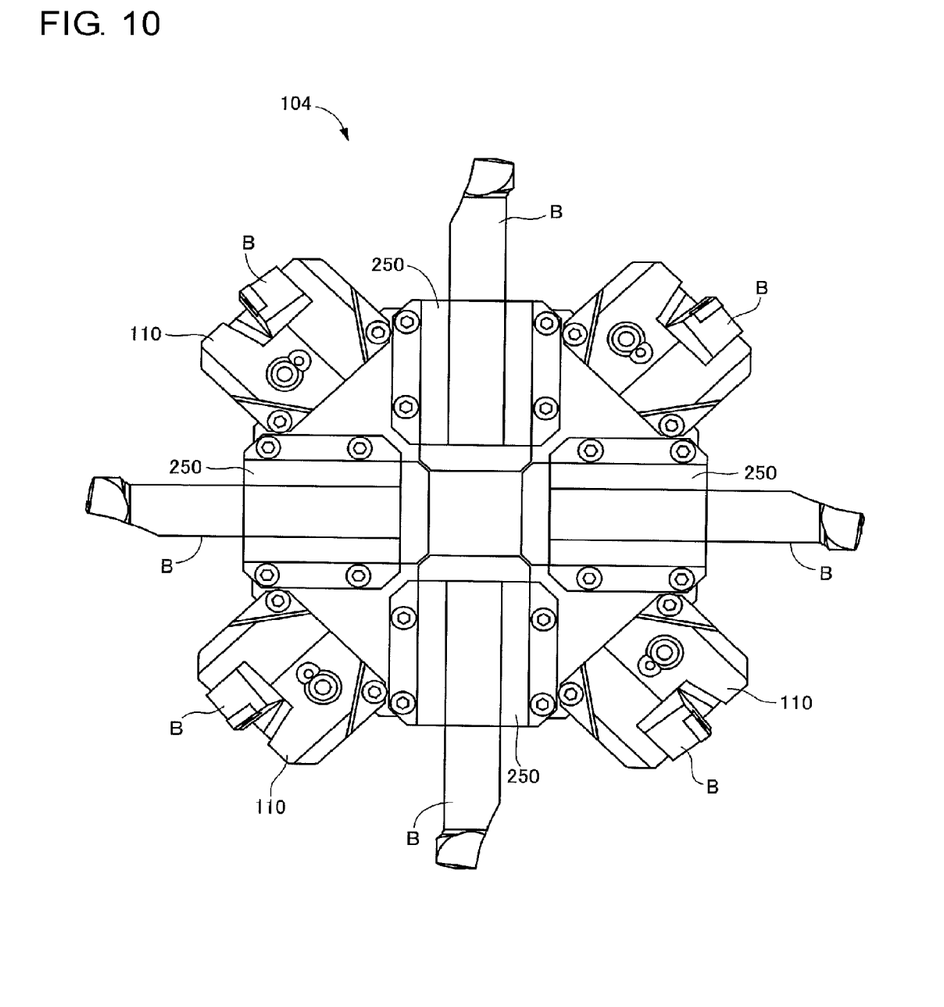
FIG. 10 is a diagram in which the embodiment of the machining head that holds the bite instead of the rotating tool is viewed from below.

In this machining head 100, bite B can also be held extending in the horizontal direction with another type of bite holder 250 that differs from the above-described bite holder 110 mounted in place of tool attaching unit 106 as illustrated in FIGS. 9 and 10. FIG. 10 shows a state where four bite holders 250 are mounted in place of all the four tool attaching units 106.

REFERENCE SIGNS LIST

100: Machining head, 102: Base body, 104: Turret, 106 (106A, 106B): Tool attaching unit, 118: Tubular body [tubular portion], 130: Main spindle, 132: Main gear, 140: Motor, 148: Motor shaft, 150: Rotary tube [switchable turret rotation transmission mechanism]152: Spline, 154: Spline tube, 156: Spline, 158: First spline mechanism [ switchable turret rotation transmission mechanism] , 160: Spline, 162: Spline ring, 164: Second spline mechanism, 166: Toothless portion, 168: Toothed portion, 170: Toothless portion, 172: Toothed portion, 194: Relative moving device [switchable turret rotation transmission mechanism], 200: Coupling ring, 202: Coupling ring, 204: Switchable connection mechanism, 222: First tool rotation transmission mechanism, 242: Second tool rotation transmission mechanism, T: Rotating tool, O: Axis, P: Pitch

The invention claimed is:
1. A machining head comprising:
a base body;
a turret, support by the base body and provided with multiple rotating tools, that rotates about an axis such that one of the multiple rotating tools for performing machining is positioned at a specific position; and
a single motor supported by the base body,
wherein, during the machining, the single motor performs both rotation of the multiple rotating tools and rotation of the turret,
wherein the turret includes a cylindrical tubular portion positioned such that a central axis thereof coincides with the axis of rotation of the turret, the machining head further comprising:
a main spindle rotatably held by the tubular portion in a state of being coaxially inserted into the tubular portion and rotated by rotation of a motor shaft as a rotary shaft of the motor;
multiple tool holding shafts rotatably held by the turret and respectively holding the multiple rotating tools;
a tool rotation transmission mechanism that transmits the rotation of the main spindle to each of the multiple tool holding shafts as rotation of the respective tool holding shafts; and
a switchable turret rotation transmission mechanism capable of transmitting the rotation of the motor shaft to the turret as the rotation of the turret and releasing the transmission of the motor shaft to the turret such that the turret does not rotate, and
wherein the switchable turret rotation transmission mechanism includes:
a rotary tube externally fitted with the tubular portion of the turret and rotated about the axis by the rotation of the motor shaft:
a relative moving device moving one of the rotary tube and the tubular portion of the turret with respect to the other between a first position and a second position in an axial direction as a direction in which the axis extends; and a spline mechanism configured to have a spline formed in an inner peripheral portion of the rotary tube and a spline formed in an outer peripheral portion of the tubular portion of the turret, the splines meshing with each other in a state where one of the rotary tube and the tubular portion of the turret is positioned at the first position, and the splines not meshing with each other in a state where one of the rotary tube and the tubular portion of the turret is positioned at the second position.

2. The machining head according to claim 1, wherein each of the spline formed in the inner peripheral portion of the rotary tube and the spline formed in the outer peripheral portion of the tubular portion of the turret is shaped such that multiple toothless portions with no tooth over the entire periphery and multiple toothed portions with teeth over the entire periphery are alternately aligned at an equal pitch in the axial direction, and wherein the spline mechanism is configured such that the multiple toothed portions of the spline formed in the inner peripheral portion of the rotary tube and the multiple toothed portions of the spline formed in the outer peripheral portion of the tubular portion of the turret are positioned at positions matching with each other in the axial direction in a state where one of the rotary tube and the tubular portion of the turret is positioned at the first position by the relative moving device, and the multiple toothed portions of one of the spline formed in the inner eripheralperipheral portion of the rotary tube and the spline formed in the outer peripheral portion of the tubular portion of the turret are positioned at positions matching with the multiple toothless portions of the other in the axial direction and the multiple toothless portions of the one are positioned at positions matching with the toothed portions of the other in the axial direction in a state where one of the rotary tube and the tubular portion of the turret is positioned at the second position by the relative moving device.

3. The machining head according to claim 1, wherein the main spindle includes an extending portion extending in the axial direction from the tubular portion of the turret, the rotary tube has a facing portion opposite an outer peripheral portion of the extending portion in the inner peripheral portion, and the main spindle is configured to rotate by the motor by the extending portion and the facing portion of the rotary tube meshing with each other via another spline mechanism.

4. The machining head according to claim 1, wherein the motor shalt, the main spindle, the tubular portion of the turret, and the rotary tube are coaxially arranged.

5. The machining head according to claim 1, wherein the turret is supported to be capable of moving in the axial direction with respect to the base body and the rotary tube is not capable of moving relative to the motor shaft in the axial direction, and wherein the relative moving device is configured to move the tubular portion of the turret with respect to the rotary tube in the axial direction and between the first position and the second position by moving the the turret in the axial direction.

6. The machining head according to claim 5, further comprising a switchable connection mechanism between the turret and the base body such that the rotation of the turret with respect to the base body is allowed in a state where the tubular portion of the turret is positioned at the first position, and the rotation of the turret with respect to the base body is prohibited in a state where the tubular portion of the turret is positioned at the second position.

* * * * *